United States Patent
Chapek et al.

(10) Patent No.: US 9,404,723 B2
(45) Date of Patent: Aug. 2, 2016

(54) DRILL PIPE MEASURING SYSTEM

(71) Applicant: Strapstick LLC, Cohasset, MN (US)

(72) Inventors: Jonathan David Chapek, Cohasset, MN (US); Matthew D. Lepper, Perham, MN (US)

(73) Assignee: Strapstick LLC, Cohasset, MN (US)

( * ) Notice: Subject to any disclaimer, the term of this patent is extended or adjusted under 35 U.S.C. 154(b) by 85 days.

(21) Appl. No.: 14/485,034

(22) Filed: Sep. 12, 2014

(65) Prior Publication Data

US 2015/0075021 A1  Mar. 19, 2015

Related U.S. Application Data

(60) Provisional application No. 61/877,450, filed on Sep. 13, 2013.

(51) Int. Cl.
  *G01B 3/10* (2006.01)
(52) U.S. Cl.
  CPC ............ *G01B 3/1084* (2013.01); *G01B 3/1041* (2013.01)
(58) Field of Classification Search
  CPC .......................... G01B 3/1041; G01B 3/1084
  USPC ..................................... 33/759, 760, 761, 768
  See application file for complete search history.

(56) References Cited

U.S. PATENT DOCUMENTS

| | | | |
|---|---|---|---|
| 1,199,471 A | 9/1916 | Lemassena | |
| 2,544,908 A | 3/1951 | Winston | |
| 2,549,503 A * | 4/1951 | McCully | G01B 3/1071 33/760 |
| 2,571,569 A * | 10/1951 | Greenwood | G01B 3/1084 33/484 |
| 2,629,934 A | 2/1953 | Scott | |
| 2,654,155 A | 10/1953 | Barnhart | |
| 2,785,477 A | 3/1957 | Gregory | |
| 3,016,617 A | 1/1962 | Bricker | |
| 3,145,477 A | 8/1964 | Morrison | |
| 4,033,041 A | 7/1977 | Allums | |
| 6,332,277 B1 | 12/2001 | Owoc | |
| 6,658,756 B1 * | 12/2003 | Sanchez, Jr. | G01B 3/1041 211/70.6 |
| 7,020,978 B1 * | 4/2006 | Nelson | B25H 7/00 33/427 |
| 8,763,262 B2 | 7/2014 | Smith-Habelow | |
| 2005/0144793 A1 * | 7/2005 | Nelson | B25H 7/00 33/42 |
| 2006/0196072 A1 * | 9/2006 | Lewis | G01B 3/1071 33/760 |
| 2009/0193675 A1 * | 8/2009 | Sieber | A41H 1/02 33/759 |
| 2009/0271999 A1 * | 11/2009 | Alker | G01B 3/1041 33/762 |
| 2011/0203127 A1 * | 8/2011 | Mayfield | G01B 3/1071 33/768 |
| 2015/0060213 A1 * | 3/2015 | De Coi | B66B 1/3492 187/394 |
| 2015/0268024 A1 * | 9/2015 | Brossard | G01B 3/1056 33/760 |

* cited by examiner

*Primary Examiner* — G. Bradley Bennett
(74) *Attorney, Agent, or Firm* — Neustel Law Offices; Michael S. Neustel

(57) ABSTRACT

A drill pipe measuring system for efficiently and safely measuring drill pipe on an oil derrick. The drill pipe measuring system generally includes a main member, a tongue member extending outwardly from the main member, a retaining member having a groove that slidably receives the tongue member to secure a measuring tape adjacent to the tongue member and a securing member that is movably attached to an upper end of the main member to selectively retain a hook piece of the measuring tape. The securing member includes a pivot pin that the securing member pivots about and a locking member. When the locking member is in a released state, the securing member is allowed to move with respect to the main member. When the locking member is in the locked state, the securing member is prevented from moving with respect to the main member.

22 Claims, 15 Drawing Sheets

DRILL PIPE MEASURING SYSTEM

CROSS REFERENCE TO RELATED APPLICATIONS

I hereby claim benefit under Title 35, United States Code, Section 119(e) of U.S. provisional patent application Ser. No. 61/877,450 filed Sep. 13, 2013. The 61/877,450 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to drill pipe measuring devices and more specifically it relates to a drill pipe measuring system for efficiently and safely measuring drill pipe on an oil derrick.

2. Description of the Related Art

Any discussion of the related art throughout the specification should in no way be considered as an admission that such related art is widely known or forms part of common general knowledge in the field.

Measuring the drill pipe on an oil derrick or other type of derrick requires a device to secure the measuring tape that goes up and down the vertical pipe area being measured which is also known as "strapping pipe". A conventional device used to assist in measuring drill pipe is a broomstick with the measuring tape attached to the broomstick via tape (e.g. duct tape). However, the usage of a broomstick does not meet the safety rules used by various companies or safety organizations such as the Occupational Safety and Health Administration (OSHA) because the tape is not completely tied off to the measuring device. In addition, it is a violation of OSHA's rules and company safety rules to bring the broomstick above the head of a worker without having it tied off at all times and secured properly.

Because of the inherent problems with the related art, there is a need for a new and improved drill pipe measuring system for efficiently and safely measuring drill pipe on an oil derrick.

BRIEF SUMMARY OF THE INVENTION

The invention generally relates to a drill pipe measuring system which includes a main member, a tongue member extending outwardly from the main member, a retaining member having a groove that slidably receives the tongue member to secure a measuring tape adjacent to the tongue member and a securing member that is movably attached to an upper end of the main member to selectively retain a hook piece of the measuring tape. The securing member includes a pivot pin that the securing member pivots about and a locking member. When the locking member is in a released state, the securing member is allowed to move with respect to the main member. When the locking member is in the locked state, the securing member is prevented from moving with respect to the main member.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 3a is a side view of FIG. 2a.

FIG. 11 is a cross sectional view taken along line 11-11 of FIG. 3a.

DETAILED DESCRIPTION OF THE INVENTION

A. Overview

Figure 1:
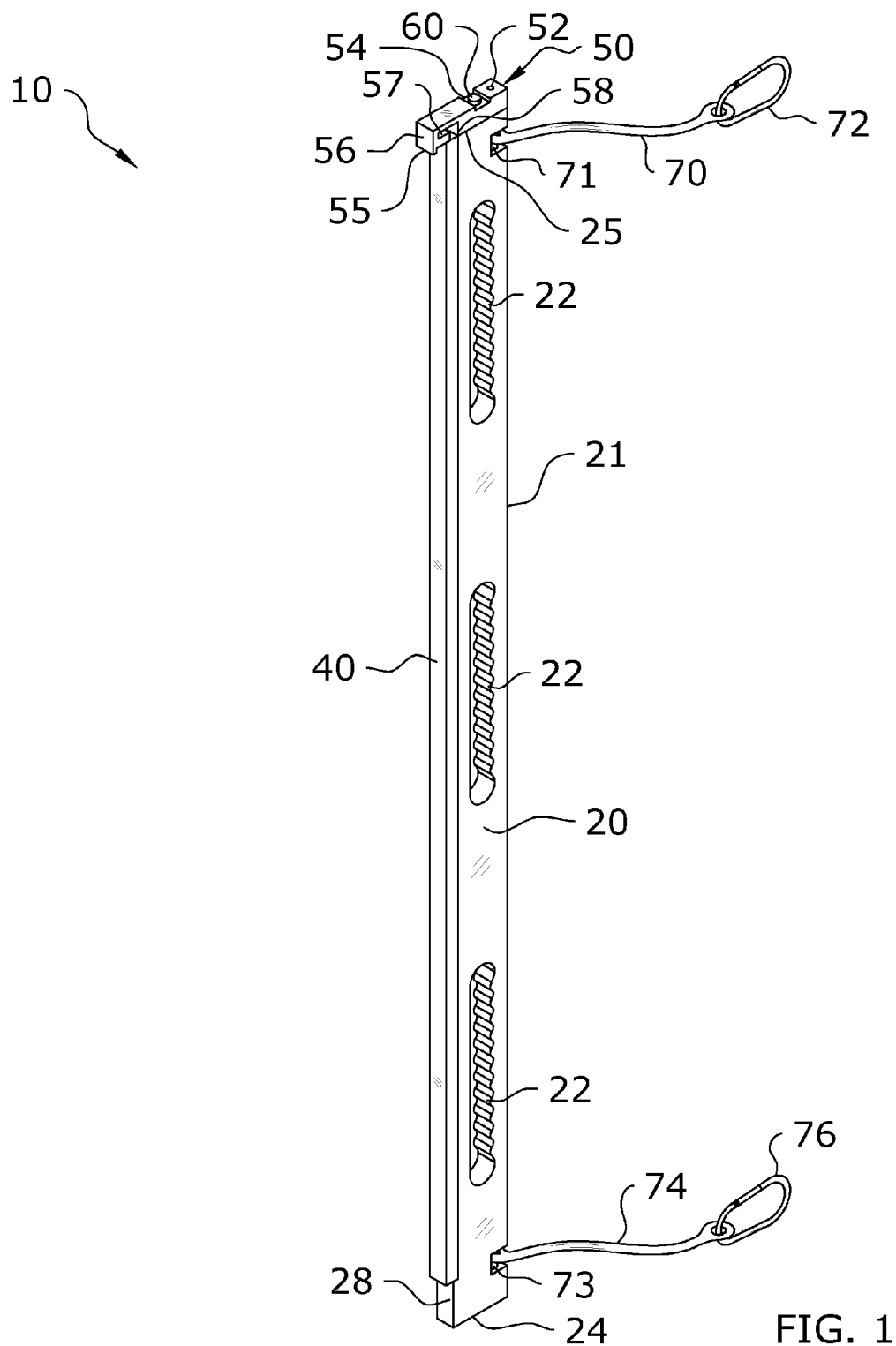
FIG. 1 is an upper perspective view of the present invention.

Turning now descriptively to the drawings, in which similar reference characters denote similar elements throughout the several views, FIGS. 1 through 11 illustrate a drill pipe measuring system 10, which comprises a main member 20, a tongue member 30 extending outwardly from the main member 20, a retaining member 40 having a groove 42 that slidably receives the tongue member 30 to secure a measuring tape 14 adjacent to the tongue member 30 and a securing member 50 that is movably attached to an upper end 25 of the main member 20 to selectively retain a hook piece 16 of the measuring tape 14. The securing member 50 includes a pivot pin 52 that the securing member 50 pivots about and a locking member 60. When the locking member 60 is in a released state, the securing member 50 is allowed to move with respect to the main member 20. When the locking member 60 is in the locked state, the securing member 50 is prevented from moving with respect to the main member 20.

B. Measuring Tape

The measuring tape 14 (a.k.a. tape measure) may be comprised of any elongated device that has measurements printed thereupon to measure a stand of drill pipe 12 or an individual drill pipe 12. The measuring tape 14 is typically comprised of a flexible ruler device constructed of a metal strip or fiber glass. The measurements printed on the measuring tape 14 may be in feet, inches, meters, centimeters or any combination thereof. The measuring tape 14 includes a hook piece 16 at the distal end thereof that is used to removably connect to the top end of the stand of drill pipe 12 thereby allowing the remaining portion of the measuring tape 14 to be lowered to measure the entire length of the stand of drill pipe 12 (or a single drill pipe 12). The measuring tape 14 may include a housing that the measuring tape 14 may be wound into and dispensed from.

The measuring tape 14 may have various lengths, but is preferably at least 90 feet in length since a standard length of a stand of drill pipe 12 (typically 2-3 sections of drill pipe 12) is approximately 90 feet. The total length of the measuring tape 14 may be less than or greater than 90 feet. The stand of drill pipe 12 is vertically orientated on the derrick. The drill pipe 12 is comprised of steel piping that is used on oil derricks to facilitate the drilling of a wellbore and come in various sizes, strengths and lengths (typically 30 to 33 feet in length)

C. Main Member

FIGS. 1 through 5 illustrate the main member 20 having a front side 27, a rear side 21, an upper end 25 and a lower end 24. The measuring tape 14 is positionable near the front side 27 of the main member 20 as illustrated in FIGS. 2*b* and 3*b* of the drawings. The main member 20 is preferably constructed of a plastic material, but may be constructed of various other types of material such as metal, wood or fiberglass. The main member 20 preferably has a generally rectangular cross sectional area as illustrated in FIG. 11 of the drawings.

Figure 2A:
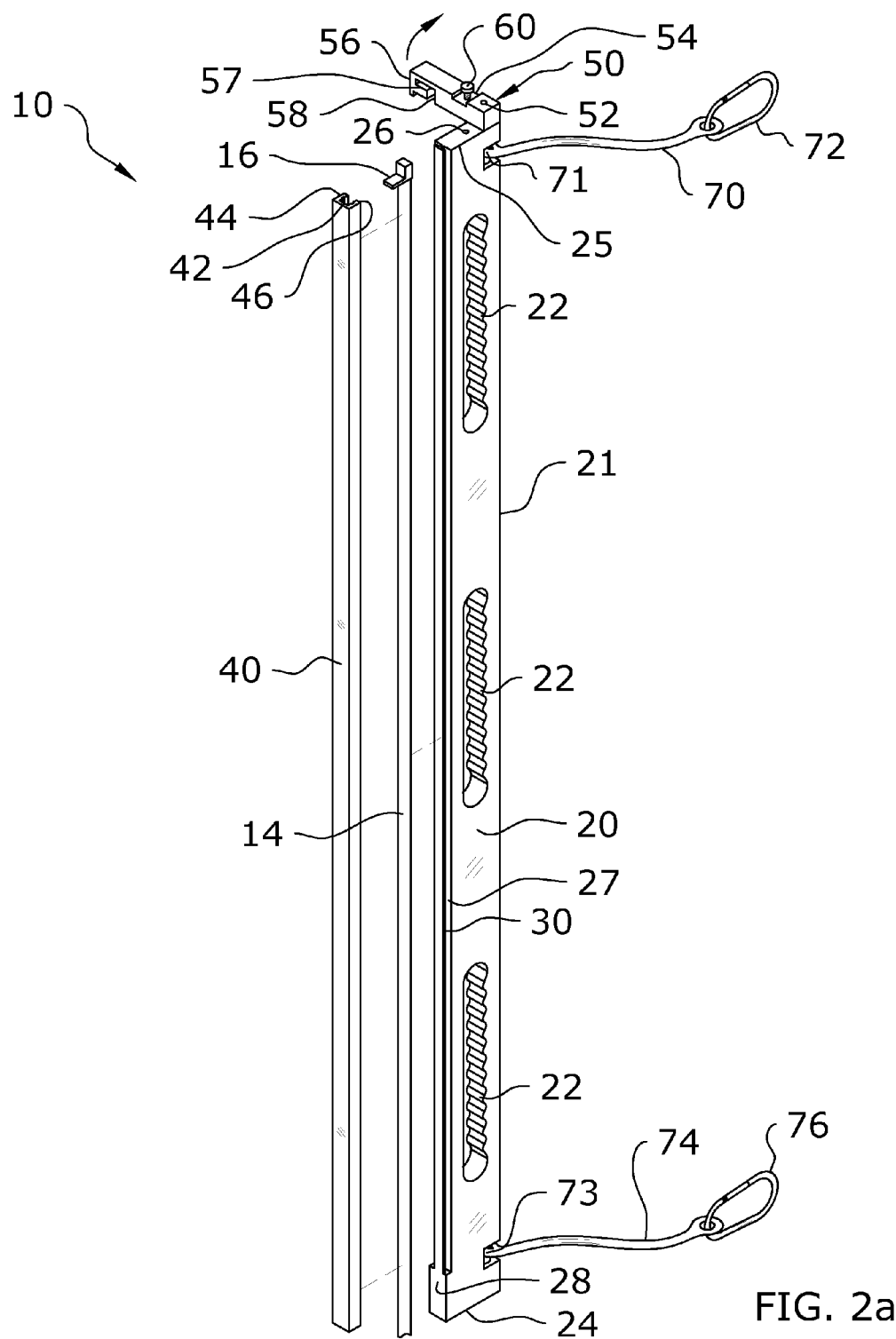
FIG. 2a is an exploded upper perspective view of the present invention with a measuring tape.
Figure 2B:
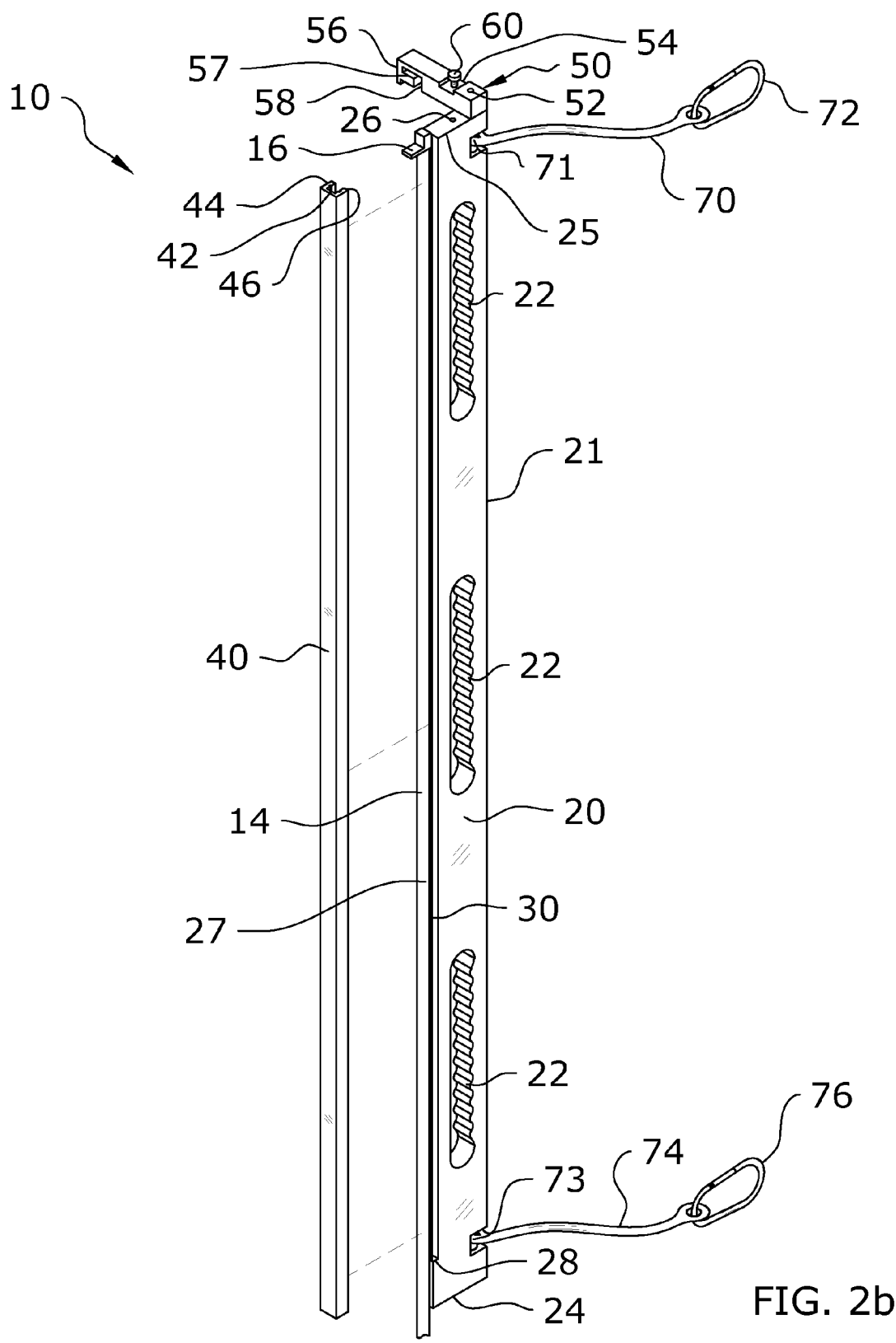
FIG. 2b is an exploded upper perspective view of the present invention with the measuring tape positioned against the tongue member of the main member.
Figure 3A:
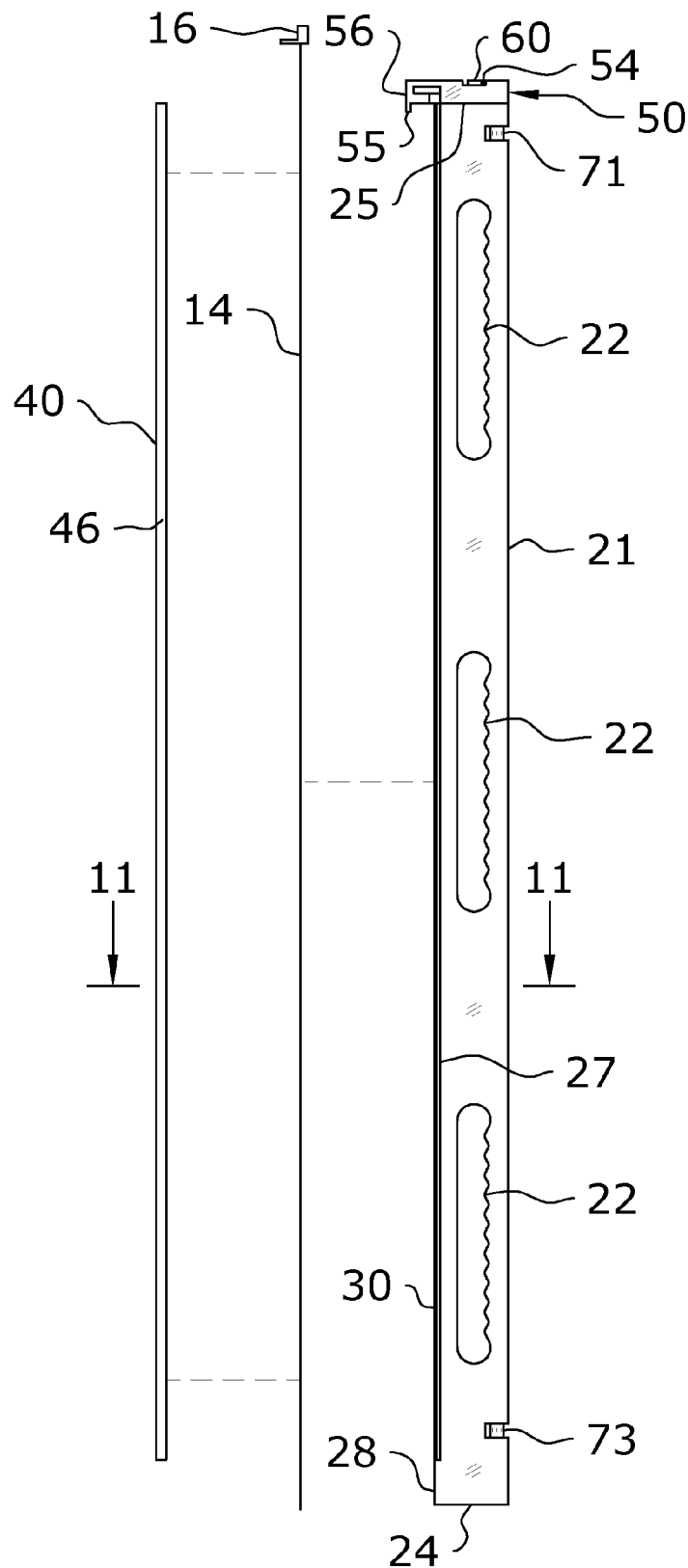
Figure 3B:
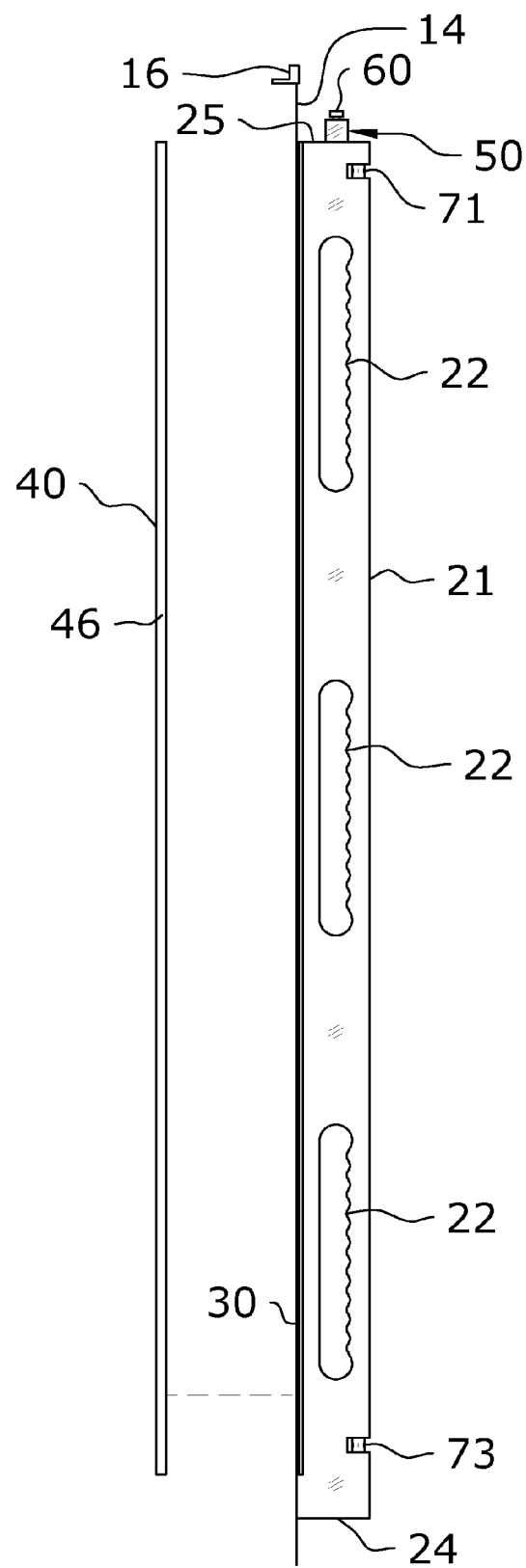
FIG. 3b is a side view of FIG. 2b.
Figure 3C:
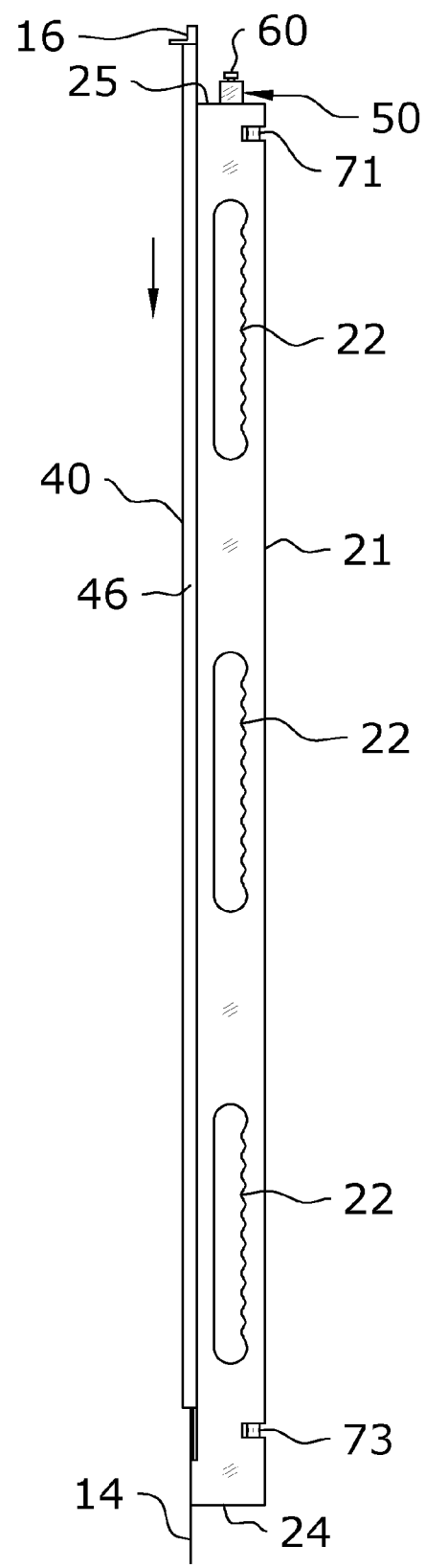
FIG. 3c is a side view of FIG. 2c.
Figure 3D:
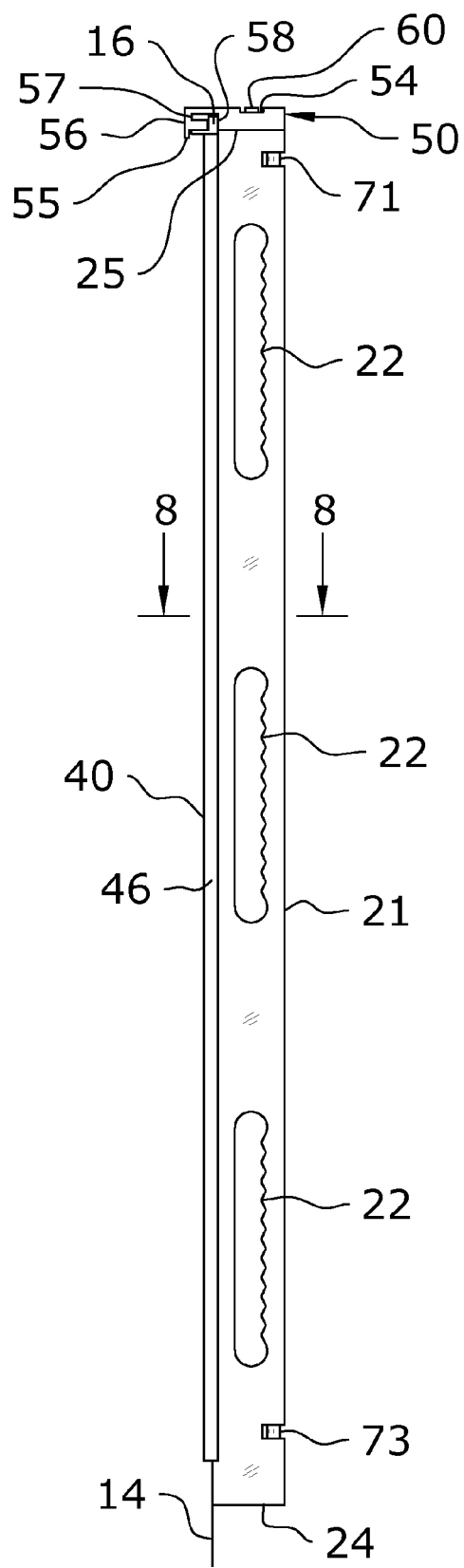
FIG. 3d is a side view of FIG. 2d.
Figure 4:
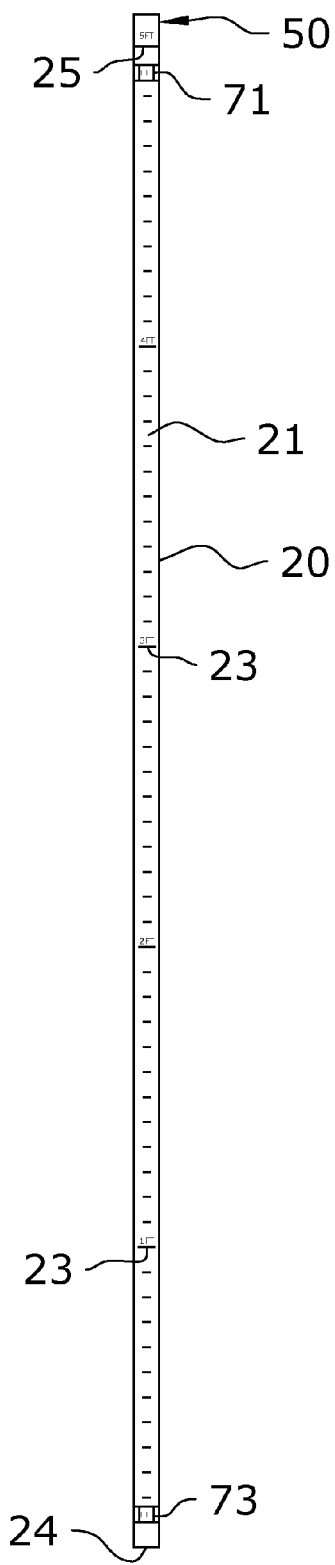
FIG. 4 is a rear view of the present invention illustrating the measurement indicia.
Figure 5:
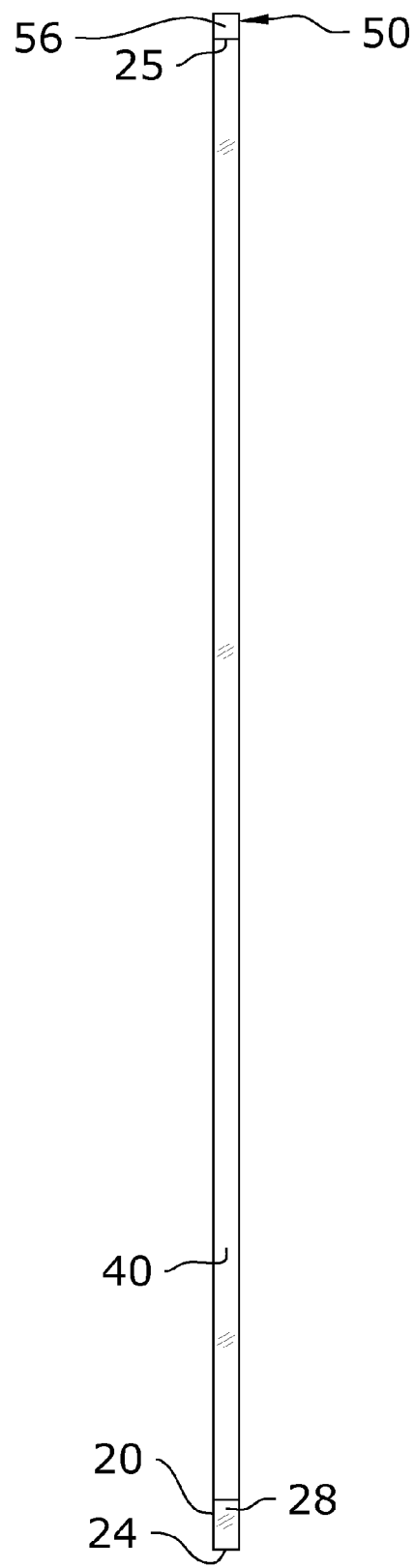
FIG. 5 is a front view of the present invention.
Figure 6:
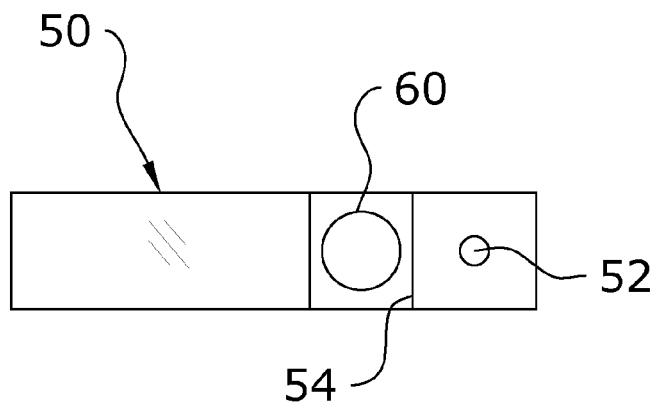
FIG. 6 is a top view of the present invention.
Figure 7:
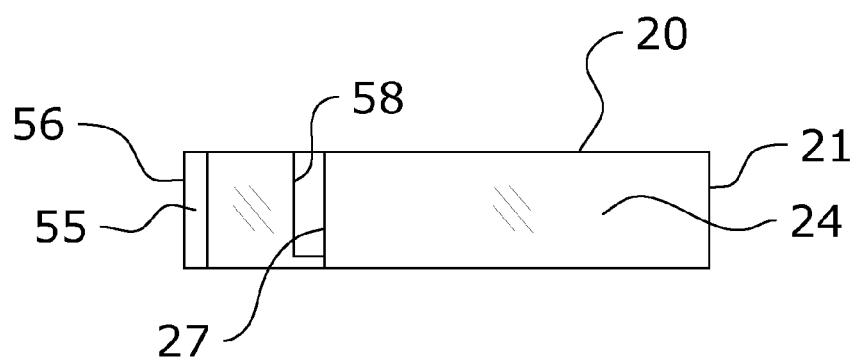
FIG. 7 is a bottom view of the present invention.

The main member 20 is preferably comprised of an elongated structure as illustrated in FIGS. 1 through 5 of the drawings, however, the main member 20 may be comprised of a non-elongated structure. The main member 20 in combination with the securing member 50 is preferably at least five feet in length to allow the main member 20 to be used for shorter measurements. FIG. 4 illustrates the rear side 21 of the main member 20 including measurement indicia 23 between the upper end 25 and the lower end 24 of the main member 20.

The front side 27 of the main member 20 includes a tongue member 30 that extends outwardly opposite of the rear side 21 of the main member 20. The retaining member 40 slidably connects to the tongue member 30 from the top end of tongue member 30 thereby defining an elongated passage between the retaining member 40 and the tongue member 30 that receives and retains the measuring tape 14 as illustrated in FIG. 8 of the drawings.

Figure 8:
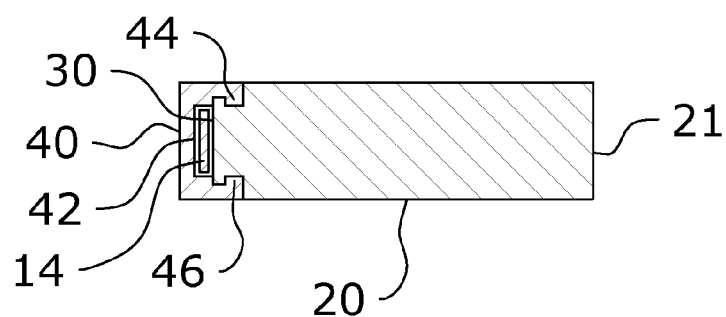
FIG. 8 is a cross sectional view taken along line 8-8 of FIG. 3d.
Figure 11:
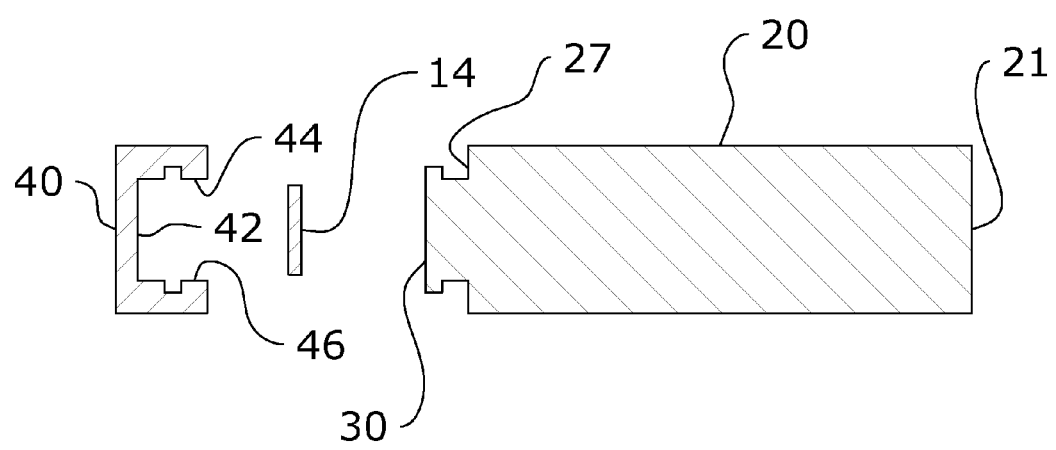

As illustrated in FIGS. 8 and 11 of the drawings, the tongue member 30 has a T-shaped cross sectional shape to allow for slidable reception of the retaining member 40. The T-shaped cross sectional shape of the tongue member 30 forms a pair of slots on opposing sides of the tongue member 30 that receives the jaws 44, 46 of the retaining member 40 in a slidable manner. The tongue member 30 may have various other types of cross sectional shapes suitable for slidably receiving the retaining member 40.

The tongue member 30 extends from the upper end 25 of the main member 20 along a substantial length of the main member 20. The retaining member 40 preferably extends along at least ninety percent of a length of the main member 20 from the upper end 25 towards the lower end 24. The tongue member 30 preferably does not extend to the lower end 24 and instead preferably terminates at a stopper portion 28 of the main member 20.

The main member 20 further includes one or more grip openings 22 that allow for a user to extend their fingers through to grasp the main member 20 as illustrated in FIGS. 1 through 3*d* of the drawings. The grip openings 22 are comprised of an elongated opening structure and preferably include gripping on the side of the opening closest to the rear side 21 of the main member 20 as best illustrated in FIGS. 3*a* through 3*d* and 9 of the drawings.

An upper strap 70 with an upper hook 72 is connected to an upper portion of the main member 20 and a lower strap 74 with a lower hook 76 is connected to a lower portion of the main member 20. The straps 70, 74 are used to secure the present invention when used in an elevated state to comply with rules and regulations of OSHA and of businesses. The main member 20 includes an upper cutout that includes an upper connector 71 that the upper strap 70 is attached to and a lower cutout that includes a lower connector 73 that the lower strap 74 is attached to as illustrated in FIGS. 3*a* through 3*d* of the drawings.

D. Retaining Member

Figure 2C:
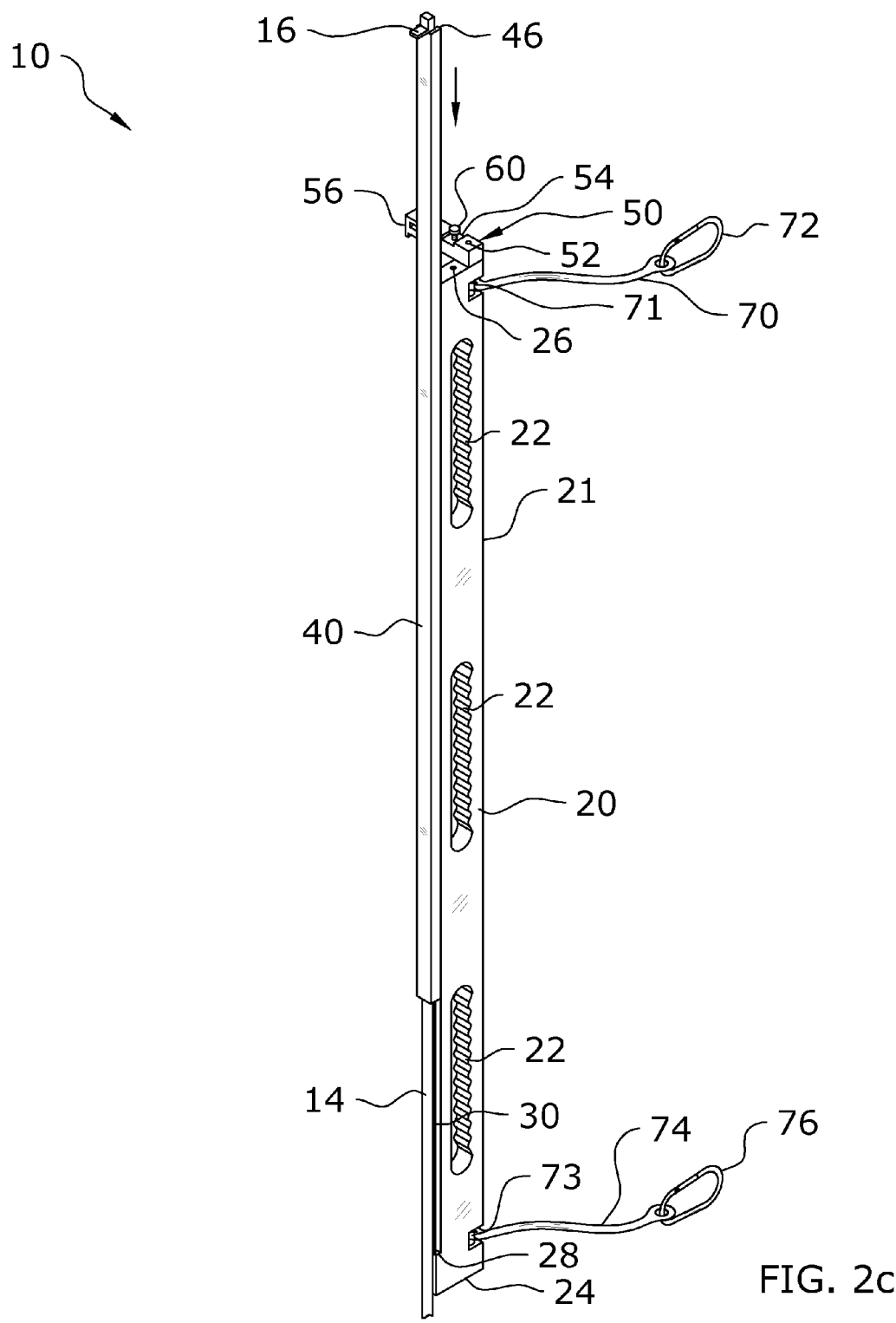
FIG. 2c is an exploded upper perspective view of the present invention with the measuring tape positioned against the tongue member of the main member and the retaining member partially connected to the main member.

The retaining member 40 is removably connectable to the main member 20 to retain the measuring tape 14 near the front side 27 of the main member 20. As illustrated in FIGS. 2*c* and 3*c* of the drawings, the retaining member 40 is slidably connectable to the main member 20 to retain the measuring tape 14 within a passage formed between the retaining member 40 and the main member 20. The retaining member 40 is comprised of an elongated structure that may have a length the same as the main member 20 but is preferably less than the length of the main member 20.

The passage formed between the retaining member 40 and the main member 20 extends along the entire length of the retaining member 40 preferably and has a cross sectional shape larger than the cross sectional shape of the measuring tape 14 as illustrated in FIG. 8 of the drawings. The passage formed between the retaining member 40 and the main member 20 is also smaller than a hook piece 16 of the measuring tape 14 thereby preventing the measuring tape 14 from passing through the passage when the hook piece 16 of the measuring tape 14 is adjacent to the upper end 25 of the main member 20.

The retaining member 40 includes a groove 42 that extends along the entire length of the retaining member 40 thereby forming a lower opening and an upper opening at the respective ends of the retaining member 40. The groove 42 of the retaining member 40 slidably receives the tongue member 30 to form a sliding connection system and with the interior wall facing the tongue member 30 distally spaced apart sufficiently to receive the measuring tape 14 between thereof. The retaining member 40 is parallel with respect to the front side 27 of the main member 20 when attached to the main member 20 as illustrated in FIGS. 3*c* and 3*d* of the drawings.

The retaining member 40 has a generally U-shaped cross sectional shape as best illustrated in FIG. 11 of the drawings. The retaining member 40 includes a first jaw 44 and a second jaw 46 opposite of the first jaw 44, wherein the jaws are on opposite sides of the groove 42, wherein the first jaw 44 defines a first receiver slot, wherein the second jaw 46 defines a second receiver slot, and wherein the receiver slots slidably receive a distal cross portion of the tongue member 30.

E. Securing Member

The securing member 50 is movably attached to the upper end 25 of the main member 20 to selectively retain the hook piece 16 of the measuring tape 14 in a secured position and to selectively retain the retaining member 40 in a substantially non-movable state with respect to the main member 20. The securing member 50 prevents the retaining member 40 from being removed from the main member 20 when the securing member 50 is in a locked state. FIGS. 1 through 6 and 9 best illustrate the securing member 50.

The securing member 50 includes a pivot pin 52 that extends from the securing member 50 to and into the upper end 25 of the main member 20. The pivot pin 52 prevents the securing member 50 from extending outwardly away from the upper end 25 of the main member 20 while allowing the securing member 50 to freely pivot about the upper end 25 of the main member 20 when the locking member 60 is released. As illustrated in FIGS. 2a and 2b of the drawings, the securing member 50 pivots about the pivot pin 52.

The locking member 60 extends from the securing member 50 to selectively engage the main member 20 to prevent movement of the securing member 50. When the locking member 60 is in a released state the securing member 50 is allowed to move (e.g. pivot) with respect to the main member 20 and wherein when the locking member 60 is in a locked state the securing member 50 is prevented from moving with respect to the main member 20. The locking member 60 extends through the securing member 50 offset a distance from the pivot pin 52 to prevent rotation of the securing member 50 when the locking member 60 is secured to the main member 20.

Figure 2D:
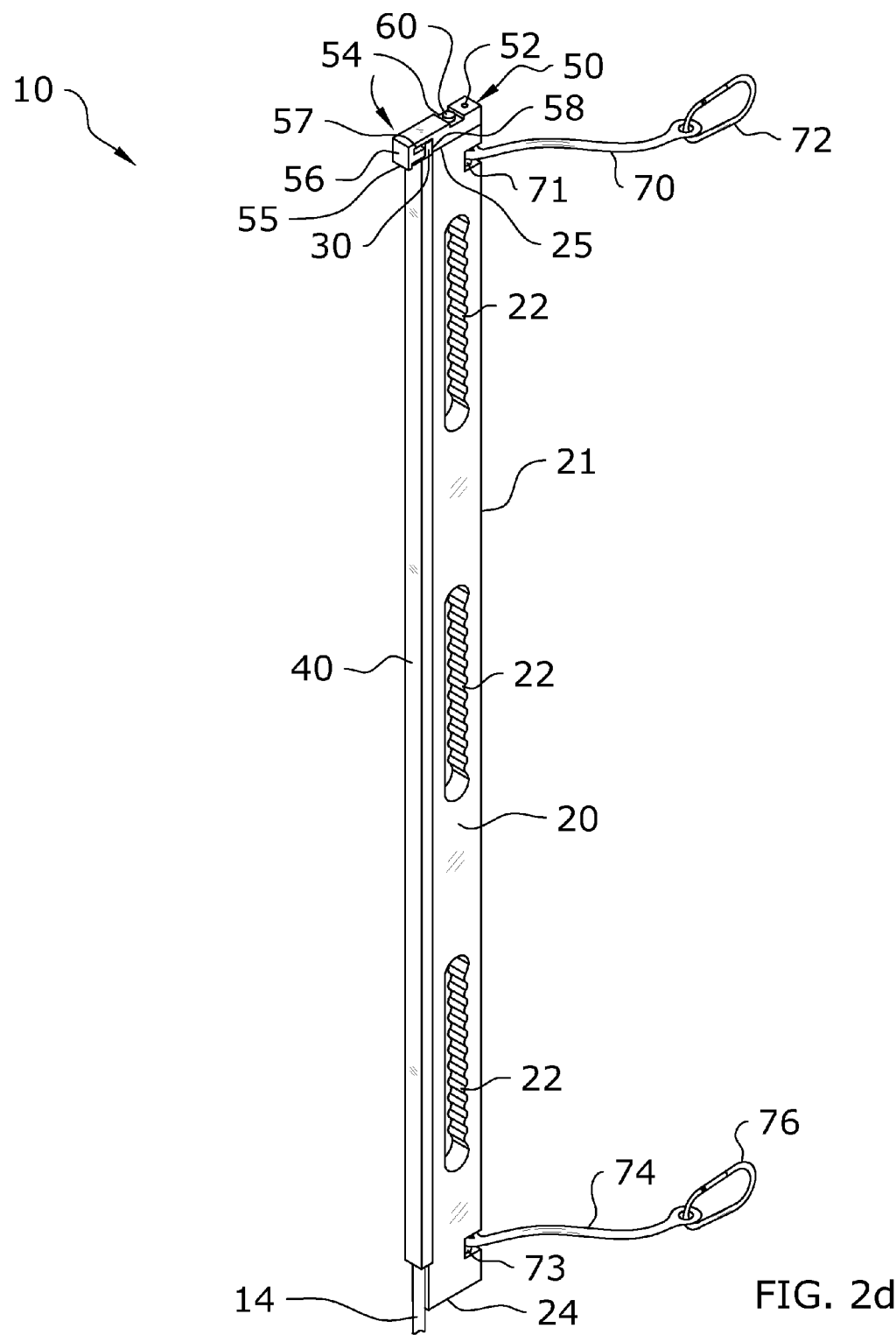
FIG. 2d is an exploded upper perspective view of the present invention with the measuring tape positioned against the tongue member of the main member and the retaining member fully connected to the main member.
Figure 9:
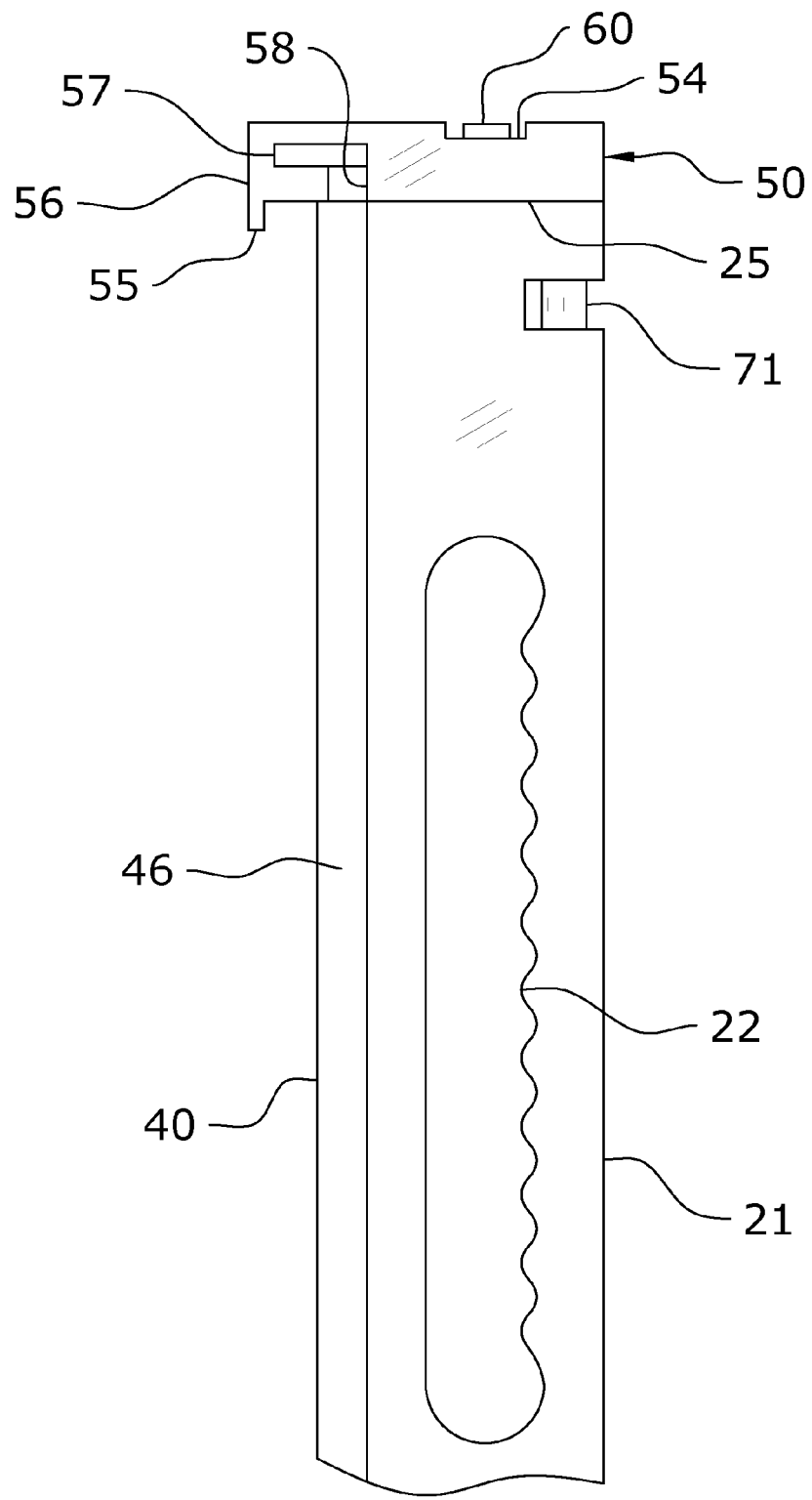
FIG. 9 is a magnified side view of the upper portion of the invention.

The locking member 60 is preferably comprised of a threaded device such as a threaded shaft that is threadably received within a threaded aperture 26 within the upper end 25 of the main aperture. The threaded aperture 26 within the upper end 25 of the main member 20 may be comprised of a female threaded metal insert that is aligned with the locking member 60 when the securing member 50 is positioned within the locked state as illustrated in FIGS. 1, 2d and 9 of the drawings. The locking member 60 preferably includes a head portion that is broader than the threaded shaft portion of the locking member 60. The head portion is preferably received within a recessed cutout within the securing member 50 so that when the locking member 60 locks the securing member 50 the head portion does not extend above the outer surface of the securing member 50 as best illustrated in FIGS. 1 and 9 of the drawings.

The securing member 50 further includes a distal portion 56 that extends outwardly from the main member 20. A catch member 55 extends downwardly from the distal portion 56 to allow for catchable engagement of the top end of a drill pipe 12 being measured. The catch member 55 extends downwardly as best illustrated in FIG. 9 of the drawings.

As further shown in FIG. 9 of the drawings, the securing head includes a first slot 57 that extends horizontally through a portion of the securing member 50 to receive a portion of the hook piece 16 of the measuring tape 14. The securing head further includes a second slot 58 that extends vertically from the first slot 57 that allows for passage of the measuring tape 14. The second slot 58 is narrow enough to prevent movement of the retaining member 40 when the securing member 50 is in the locked state. Neither the first slot 57 or the second slot 58 have to pass completely through the securing member 50 just as long as they are sufficient to receive the hook piece 16 of the measuring tape 14 and the measuring tape 14.

F. Operation of Preferred Embodiment

Figure 10:
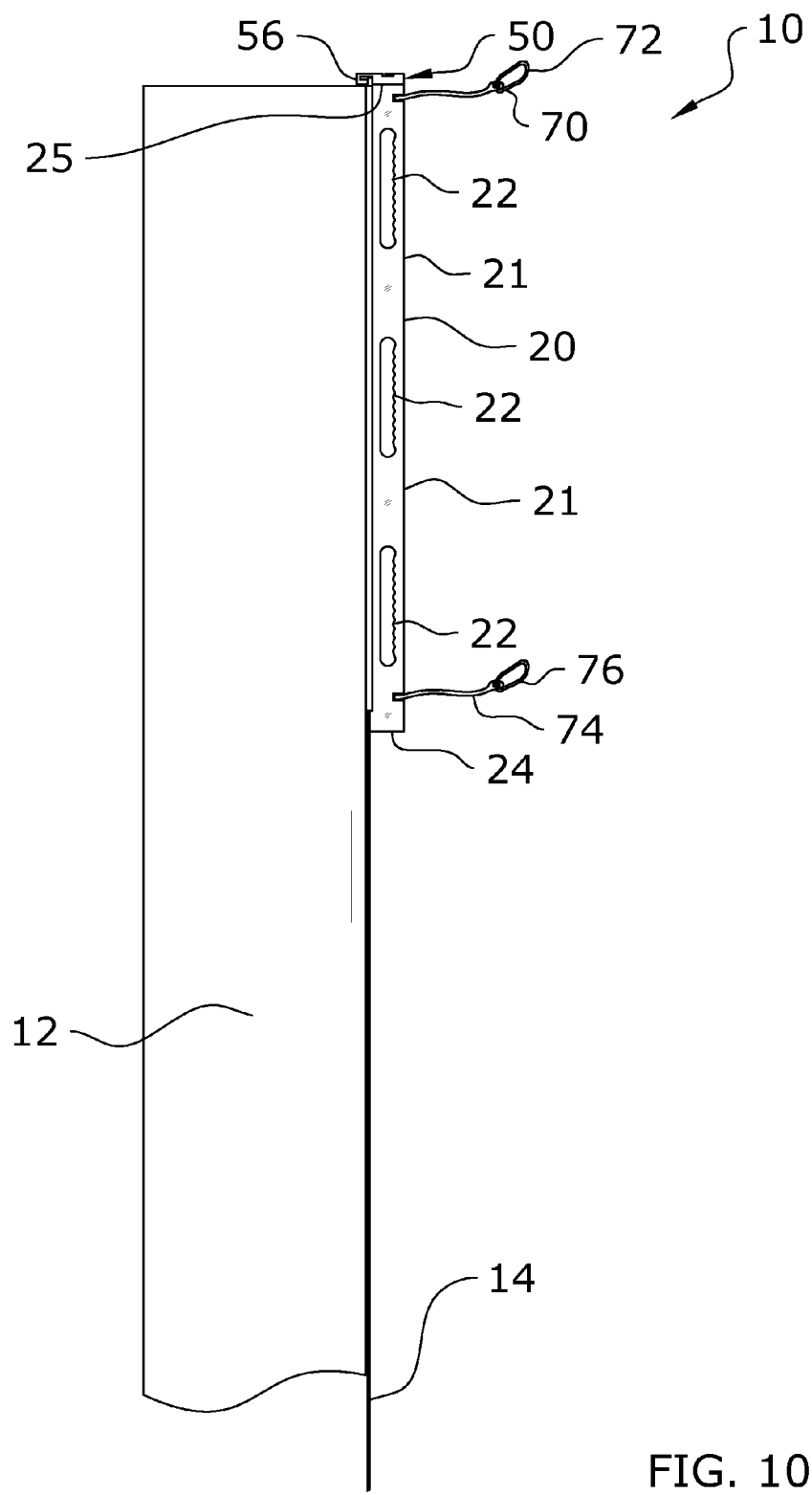
FIG. 10 is a side view of the present invention connected to the upper end of a drill pipe being measured.

In use, the user loosens the locking member 60 to an unlocked state and then pivots the securing member 50 outwardly as illustrated in FIG. 2a of the drawings. The user then positions the measuring tape 14 adjacent to the front side 27 of the main member 20 as illustrated in FIGS. 2b and 3b of the drawings. The user then slides the retaining member 40 downwardly from the upper end 25 of the main member 20 along the tongue member 30 until the retaining member 40 engages the stopper portion 28 of the main member 20 with the measuring tape 14 positioned between the retaining member 40 and the main member 20. The user then pivots the securing member 50 back to the original position and then secures the locking member 60 to the locked state to prevent movement of the securing member 50 as illustrated in FIGS. 2d and 3d of the drawings. The present invention is then lifted upwardly via an elevator or other lifting device on the derrick where another individual at the upper portion of the derrick is able to secure one of the straps 70, 74 for safety reasons and then hook the distal portion 56 of the securing member 50 to the top end of the drill pipe 12 being measured as illustrated in FIG. 10 of the drawings. The measuring tape 14 extends along the length of the stand of drill pipe 12 being measured to the bottom thereof wherein another user is able to read and record the length of the stand of drill pipe 12. This process continues until no further measurements are required and then the present invention is lowered.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A drill pipe measuring device, comprising:
   a main member having a front side, a rear side, an upper end and a lower end, wherein a measuring tape is positionable near said front side; and
   a retaining member removably connectable to said main member to retain said measuring tape near said front side of said main member, wherein said retaining member extends along at least ninety percent of a length of said main member from said upper end towards said lower end.

2. The drill pipe measuring device of claim 1, wherein said rear side includes measurement indicia between said upper end and said lower end of said main member.

3. The drill pipe measuring device of claim 1, wherein said retaining member is slidably connectable to said main member.

4. The drill pipe measuring device of claim 1, wherein said front side of said main member includes a tongue member, wherein said retaining member slidably connects to said tongue member defining a passage between thereof that receives said measuring tape.

5. The drill pipe measuring device of claim 4, wherein said tongue member has a T-shaped cross sectional shape.

6. The drill pipe measuring device of claim 5, wherein said retaining member includes a first jaw and a second jaw opposite of said first jaw, wherein said jaws are on opposite sides of said groove, wherein said first jaw defines a first receiver slot, wherein said second jaw defines a second receiver slot, and wherein said receiver slots slidably receive a distal cross portion of said tongue member.

7. The drill pipe measuring device of claim 4, wherein said retaining member includes a groove that slidably receives said tongue member.

8. The drill pipe measuring device of claim 4, wherein said passage is smaller than a hook piece of said measuring tape thereby preventing said measuring tape from passing through said passage when said hook piece of said measuring tape is adjacent to said upper end of said main member.

9. The drill pipe measuring device of claim 4, wherein said tongue member extends from said upper end of said main member along a substantial length of said main member, wherein said tongue member does not extend to said lower end.

10. A drill pipe measuring device, comprising:
a main member having a front side, a rear side, an upper end and a lower end, wherein a measuring tape is positionable near said front side;
a retaining member removably connectable to said main member to retain said measuring tape near said front side of said main member; and
a securing member that is movably attached to said upper end of said main member to selectively retain a hook piece of said measuring tape and to selectively retain said retaining member in a substantially non-movable state with respect to said main member, wherein said securing member prevents said retaining member from being removed from said main member when said securing member is in a locked state.

11. The drill pipe measuring device of claim 10, wherein said rear side includes measurement indicia between said upper end and said lower end of said main member.

12. The drill pipe measuring device of claim 10, wherein said retaining member is slidably connectable to said main member.

13. The drill pipe measuring device of claim 10, wherein said front side of said main member includes a tongue member, wherein said retaining member slidably connects to said tongue member defining a passage between thereof that receives said measuring tape.

14. The drill pipe measuring device of claim 13, wherein said tongue member has a T-shaped cross sectional shape.

15. The drill pipe measuring device of claim 14, wherein said retaining member includes a first jaw and a second jaw opposite of said first jaw, wherein said jaws are on opposite sides of said groove, wherein said first jaw defines a first receiver slot, wherein said second jaw defines a second receiver slot, and wherein said receiver slots slidably receive a distal cross portion of said tongue member.

16. The drill pipe measuring device of claim 13, wherein said retaining member includes a groove that slidably receives said tongue member.

17. The drill pipe measuring device of claim 13, wherein said passage is smaller than a hook piece of said measuring tape thereby preventing said measuring tape from passing through said passage when said hook piece of said measuring tape is adjacent to said upper end of said main member.

18. The drill pipe measuring device of claim 13, wherein said tongue member extends from said upper end of said main member along a substantial length of said main member, wherein said retaining member extends along at least ninety percent of a length of said main member from said upper end towards said lower end, and wherein said tongue member does not extend to said lower end.

19. The drill pipe measuring device of claim 10, wherein said securing member includes a pivot pin that extends from said securing member to said upper end of said main member and a locking member that extends from said securing member to selectively engage said main member to prevent movement of said securing member, wherein said securing member pivots about said pivot pin, wherein when said locking member is in a released state said securing member is allowed to move with respect to said main member and wherein when said locking member is in a locked state said securing member is prevented from moving with respect to said main member.

20. A drill pipe measuring device, comprising:
a main member having a front side, a rear side, an upper end and a lower end, wherein a measuring tape is positionable near said front side; and
a retaining member removably connectable to said main member to retain said measuring tape near said front side of said main member;
wherein said front side of said main member includes a tongue member, wherein said retaining member slidably connects to said tongue member defining a passage between thereof that receives said measuring tape;
wherein said tongue member has a T-shaped cross sectional shape;
wherein said retaining member includes a first jaw and a second jaw opposite of said first jaw, wherein said jaws are on opposite sides of said groove, wherein said first jaw defines a first receiver slot, wherein said second jaw defines a second receiver slot, and wherein said receiver slots slidably receive a distal cross portion of said tongue member.

21. A drill pipe measuring device, comprising:
a main member having a front side, a rear side, an upper end and a lower end, wherein a measuring tape is positionable near said front side; and
a retaining member removably connectable to said main member to retain said measuring tape near said front side of said main member;
wherein said front side of said main member includes a tongue member, wherein said retaining member slidably connects to said tongue member defining a passage between thereof that receives said measuring tape;
wherein said passage is smaller than a hook piece of said measuring tape thereby preventing said measuring tape from passing through said passage when said hook piece of said measuring tape is adjacent to said upper end of said main member.

22. A drill pipe measuring device, comprising:
a main member having a front side, a rear side, an upper end and a lower end, wherein a measuring tape is positionable near said front side; and a retaining member removably connectable to said main member to retain said measuring tape near said front side of said main member;

wherein said front side of said main member includes a tongue member, wherein said retaining member slidably connects to said tongue member defining a passage between thereof that receives said measuring tape;

wherein said tongue member extends from said upper end of said main member along a substantial length of said main member, wherein said tongue member does not extend to said lower end.

\* \* \* \* \*